S. OPPENHEIMER.
Milk Pail.

No. 84,572.

Patented Dec. 1, 1868.

Witnesses
D. Kittner
Thomas Chapman

Inventor.
Solomon Oppenheimer

UNITED STATES PATENT OFFICE.

SOLOMON OPPENHEIMER, OF PERU, INDIANA.

IMPROVED MILK-PAIL.

Specification forming part of Letters Patent No. 84,572, dated December 1, 1868; antedated November 30, 1868.

*To all whom it may concern:*

Be it known that I, SOLOMON OPPENHEIMER, of Peru, Miami county, Indiana, have made and invented certain new and valuable Improvements in Milk-Pails, whereby the milk is prevented from being spilled by kicks or the restlessness of the cow while being milked. A full and true description of the same is given below, reference being had to the accompanying drawings, and the letters of reference marked thereon.

Figure 1:
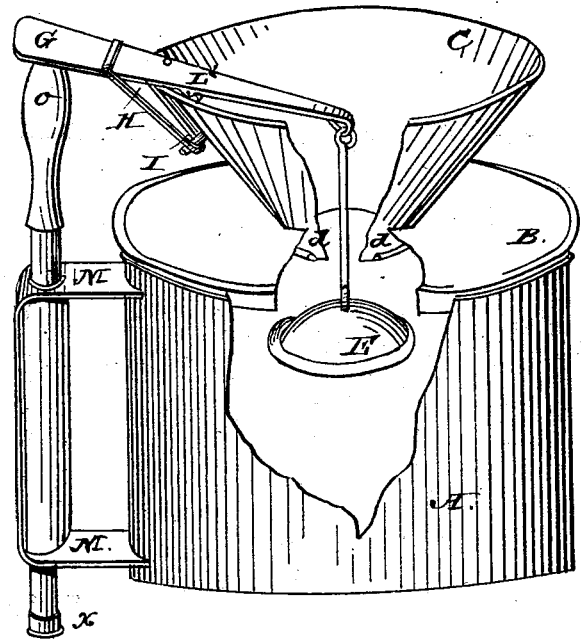

I take any common tin bucket, of suitable size, and insert into the lid thereof a hopper, similar to a funnel-top, and in a manner as shown in the drawing, Figure 1, where A represents the bucket, B the lid, and C the hopper.

Around the lower end of the hopper there is affixed a ring or hoop, $d\ d$, and to it is made to fit, when pressed up, a conical valve, E. This valve is suspended on a wire rod from the end of a lever, G, and is pressed up to the hopper by means of an elastic rubber band, H, laid over the outer end of the lever, and hooked and stretched on a pin, I.

Figure 2:
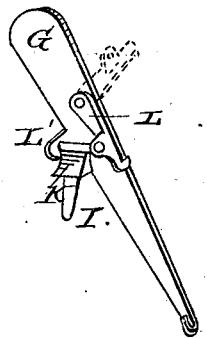

The lever G, and the manner it is attached to the hopper, is more particularly shown at Fig. 2, where is seen a standard, K, to be firmly soldered to the hopper, and the pin at its base made to project on the outside, where it forms the hook for the elastic band, as explained above.

The hinge on the lever is of the "ear pattern," and hangs on pins, which are on each side of the head of the standard. Of these ears one only, L', is permanent. The other one, L, turns on a rivet. The object of this is to enable the lever to be taken off when wanted. The dotted lines show this swivel-hinge when turned open.

Figure 3:
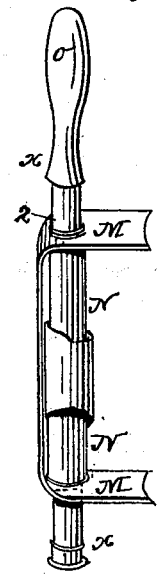

Letter M marks the handle of the bucket, into which a pipe, N, Fig. 3, is fixed, and a wooden rod, O, moves freely up and down in it. This rod extends up until it touches the lever, and reaches down a half inch or more beyond the line of bottom of the bucket.

A cap, $x$, below, and a shoulder turned onto it at $z$, prevents it from falling out, all of which is plainly seen at Fig. 3.

The operation of the pail is as follows: When it is to be used, and being set down on the ground for milking, the rod O, being the longest, strikes the ground first, and the weight of the pail pushes the rod upward and the outer end of the lever with it. The end with the valve on it descends, leaving the hopper open for the milk to flow in. Should, however, the pail get moved out of its perpendicular position or overthrown, then the pressure on the rod is removed. The elastic rubber spring then acts on the lever, and causes the valve to spring up to the hopper, closing the same, so that no milk can run out.

What I claim, and for which I desire to secure Letters Patent, is—

1. The lever C, having movable swivel-hinges, as shown at L, for the purpose specified.

2. The rod O, when constructed as shown, having shoulder $z$ and cap $x$, for the purpose shown and explained.

3. A handle on the milk-pail for the rod to pass through, having a pipe connected with it, in a manner as shown.

4. The combination of all the above-described parts, when constructed as shown, and used and applied on a milk-pail.

SOLOMON OPPENHEIMER.

Witnesses:
D. KITTNER,
THOMAS CHAPMAN.